United States Patent Office.

CHARLES McILVAINE, OF PHILADELPHIA, PENNSYLVANIA.

Letters Patent No. 108,615, dated October 25, 1870.

IMPROVEMENT IN COPYING-INKS FOR PRINTING.

The Schedule referred to in these Letters Patent and making part of the same

*To all whom it may concern:*

Be it known that I, CHARLES McILVAINE, of the city and county of Philadelphia and State of Pennsylvania, have invented a new and "Improved Copying-Ink for Printers' Use;" and I do hereby declare that the following is a full, clear, and exact description of the ingredients, and manner of preparing the same.

The nature of my invention consists in making printers' ink that will give a press-copy similar to the ordinary copying-ink used in writing. This I accomplish by using pigments or coloring-matter of different shades, that are soluble in water, or that, when mixed with soluble gums, they can be conveyed by such gums.

To produce ink of a green color, I use four parts of mallori or aniline-green, five parts of rock-candy or soluble gum, three parts of albumen, six parts of printers' varnish, molasses, glycerine, or other materials to give it the proper consistency.

To produce a red ink, I use three parts of carmine or aniline-red, two parts of albumen, four parts of rock-candy or soluble gum, seven parts of printers' varnish, molasses, glycerine, or other material to give the proper consistency to it.

A purple ink is produced by using three parts of lake or aniline-purple, two parts of albumen, four parts of rock-candy or soluble gum, seven parts of printers' varnish, molasses, glycerine, or other materials to give proper consistency.

To make ink of a blue shade, I use five parts of soluble Prussian-blue, twelve parts of rock-candy or soluble gum, fifteen parts printers' varnish, molasses, glycerine, or other materials to give the proper consistency, with a small proportion of cobalt or aniline-blue, to give it the proper shade.

If a black ink is desired, I use ten parts of logwood, treated with a chromate of potassium, one and one-half part of soluble Prussian-blue, one and one-half part of rock-candy or soluble gum, one and one-half part of printers' varnish, molasses, glycerine, or other material to give it the proper consistency, with a small proportion of lamp-black, or other jet black, to give the proper shade.

Caustic potassa, alcohol, or other chemical substance, if required, may be used with the water, to assist in transferring or developing the color on the impression copy.

It will be seen, from the above, that the proportions are varied as different shades are required.

Having thus described my invention, its ingredients and proportions,

What I claim, and desire to secure by Letters Patent, is—

The manufacture of printers' ink, (that will press-copy,) containing pigments or coloring-matter of different shades, soluble in water, or pigments or coloring-matters that are insoluble in water, but which, when mixed with soluble gum, can be conveyed by such gums, said ingredients used therewith being in or about the proportions herein specified, in order that the compounds resulting therefrom may accomplish the purpose set forth.

In testimony whereof I have hereunto signed my name in the presence of two subscribing witnesses.

CHARLES McILVAINE.

Witnesses:
ISAAC R. OAKFORD,
CHARLES H. EVANS.